(12) United States Patent
Heo

(10) Patent No.: US 10,173,725 B2
(45) Date of Patent: Jan. 8, 2019

(54) METHOD FOR CONTROLLING ELECTRIC POWER STEERING AND DEVICE THEREFOR

(71) Applicant: MANDO CORPORATION, Pyeongtaek-si, Gyeonggi-do (KR)

(72) Inventor: Hyeon Heo, Wonju-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 75 days.

(21) Appl. No.: 15/404,122

(22) Filed: Jan. 11, 2017

(65) Prior Publication Data

US 2017/0203788 A1     Jul. 20, 2017

(30) Foreign Application Priority Data

Jan. 14, 2016   (KR) ........................ 10-2016-0004694

(51) Int. Cl.
| | | |
|---|---|---|
| *B62D 15/02* | (2006.01) | |
| *G05D 1/00* | (2006.01) | |
| *B62D 1/28* | (2006.01) | |

(52) U.S. Cl.
CPC ........... *B62D 15/025* (2013.01); *B62D 1/286* (2013.01); *B62D 15/021* (2013.01); *G05D 1/0061* (2013.01); *G05D 2201/0213* (2013.01)

(58) Field of Classification Search
CPC ... B62D 15/021; B62D 15/025; G05D 1/0061
USPC ........................................................ 701/41
See application file for complete search history.

(56) References Cited

U.S. PATENT DOCUMENTS

| | | | | |
|---|---|---|---|---|
| 6,059,063 | A * | 5/2000 | Shimizu ............. | B62D 15/0285 180/204 |
| 8,116,945 | B2 * | 2/2012 | Nozawa ............... | B62D 5/0472 180/443 |
| 8,433,478 | B2 * | 4/2013 | Sasaki ................... | B62D 7/159 340/465 |
| 8,996,254 | B2 * | 3/2015 | Nishikawa ............. | B62D 6/003 701/41 |
| 9,079,607 | B2 * | 7/2015 | Tanimoto ........... | B62D 15/0245 |
| 9,205,869 | B2 * | 12/2015 | Turner ............... | B62D 15/0215 |
| 9,592,848 | B1 * | 3/2017 | Hirate .................. | B62D 5/0463 |
| 9,616,918 | B2 * | 4/2017 | Okazaki ............... | B62D 5/0466 |
| 9,731,752 | B2 * | 8/2017 | Morimoto ............ | B62D 15/025 |

(Continued)

*Primary Examiner* — Atul Trivedi
(74) *Attorney, Agent, or Firm* — Hauptman Ham, LLP

(57) ABSTRACT

The present disclosure relates to device including at least: an automatic steering mode control unit that controls a steering motor torque, corresponding to automatic steering torque information or automatic steering angle information for running of a vehicle in an automatic steering mode, to be generated when the automatic steering torque information or the automatic steering angle information is received; an automatic steering mode release determination unit that determines whether to release the automatic steering mode when a steering torque or steering angle information generated according to a steering wheel operation of a driver is detected; and an automatic steering mode release unit that determines a release time of the steering motor torque applied in the automatic steering mode, by using the steering angle information generated according to the steering wheel operation of the driver when it is determined to release the automatic steering mode.

14 Claims, 8 Drawing Sheets

(56) References Cited

U.S. PATENT DOCUMENTS

| | | | | |
|---|---|---|---|---|
| 9,771,101 B2* | 9/2017 | Mitsumoto | | B62D 1/286 |
| 9,796,416 B2* | 10/2017 | Fujii | | B62D 6/002 |
| 9,868,464 B2* | 1/2018 | Lee | | B62D 15/025 |
| 9,919,733 B2* | 3/2018 | Minaki | | B62D 5/04 |
| 9,950,734 B2* | 4/2018 | Bebernes | | A01B 69/008 |
| 2003/0069675 A1* | 4/2003 | Kifuku | | B62D 5/0463 701/41 |
| 2005/0216155 A1* | 9/2005 | Kato | | B62D 5/008 701/41 |
| 2006/0200289 A1* | 9/2006 | Chino | | B62D 5/003 701/41 |
| 2012/0130593 A1* | 5/2012 | Davis | | B62D 1/28 701/41 |
| 2014/0311814 A1* | 10/2014 | Morselli | | B62D 1/22 180/167 |
| 2015/0032336 A1* | 1/2015 | Okazaki | | B62D 5/0466 701/42 |
| 2015/0336606 A1* | 11/2015 | Shibuya | | B60W 10/02 180/444 |
| 2015/0353128 A1* | 12/2015 | Shibuya | | B60W 10/02 701/41 |
| 2015/0360715 A1* | 12/2015 | Shimizu | | B62D 5/001 701/43 |
| 2016/0039453 A1* | 2/2016 | Bebernes | | A01B 69/008 701/41 |
| 2016/0039454 A1* | 2/2016 | Mortimer | | B62D 5/0409 701/41 |
| 2016/0152267 A1* | 6/2016 | Morimoto | | B62D 15/025 701/41 |
| 2016/0159390 A1* | 6/2016 | Tamaizumi | | B62D 5/0463 701/41 |
| 2017/0008557 A1* | 1/2017 | Mitsumoto | | B62D 1/286 |
| 2017/0088174 A1* | 3/2017 | Inoue | | B60T 8/1755 |
| 2017/0088176 A1* | 3/2017 | Tamura | | B60W 30/146 |
| 2017/0096163 A1* | 4/2017 | Sakaguchi | | B62D 5/0463 |
| 2017/0190335 A1* | 7/2017 | Gillett | | B60K 7/0007 |
| 2017/0203788 A1* | 7/2017 | Heo | | B62D 1/286 |
| 2017/0274928 A1* | 9/2017 | Minaki | | B62D 5/04 |
| 2017/0297614 A1* | 10/2017 | Minaki | | B62D 5/0463 |
| 2017/0305459 A1* | 10/2017 | Minaki | | B62D 6/00 |
| 2017/0334482 A1* | 11/2017 | Kojima | | G01B 21/22 |
| 2018/0099692 A1* | 4/2018 | Oya | | B62D 5/0418 |

* cited by examiner

METHOD FOR CONTROLLING ELECTRIC POWER STEERING AND DEVICE THEREFOR

CROSS REFERENCE TO RELATED APPLICATION

This application claims priority from Korean Patent Application No. 10-2016-0004694, filed on Jan. 14, 2016, which is hereby incorporated by reference for all purposes as if fully set forth herein.

BACKGROUND OF THE INVENTION

1. Field of the Invention

The present disclosure relates to a method for controlling an electric power steering device and a device therefor. More particularly, the present disclosure relates to a method for adjusting a motor torque according to a driver's steering torque when the driver's steering torque is input in a situation where steering of a vehicle is adjusted using only the motor torque.

2. Description of the Prior Art

Generally, a steering device of a vehicle is a device for enabling a driver to change the proceeding direction of the vehicle according to the driver's will, and is a device that assists the driver to drive the vehicle in a desired direction by arbitrarily changing the rotational center of a turning wheel of the vehicle.

Recent power assisted steering devices assist steering power such that an operation of a steering wheel is heavy when a vehicle travels at a high speed and an operation of a steering wheel is light when a vehicle travels at a low speed. Various kinds of such power assisted steering devices are available, and electric power steering devices that assist steering force by using an electric motor are widely used. Electric power steering devices determine the size of assist steering force by controlling current supplied to a steering motor.

Meanwhile, studies on autonomous driving technology to minimize intervention of a driver have been actively carried out. For example, a cruise control system that minimizes a driver's intervention in controlling the speed of a vehicle been studied, and a technique that allows a vehicle to automatically steer by minimizing a driver's intervention in steering has been developed. In addition, studies on unmanned vehicles or autonomous driving techniques that exclude all intervention by a driver are also under way.

However, even when a driver's intervention in the speed or steering of a vehicle is minimized, it is necessary to maintain movement of the vehicle to be controlled by the driver's intervention when the intervention occurs due to a response to an emergency situation or restriction on the regulations. In such a situation, a control technique needs to prevent the heterogeneity or ambiguity of the movement of the vehicle at a time when the driver's intervention occurs.

SUMMARY OF THE INVENTION

An embodiment devised in the described background arts provides a method and device for preventing a sudden change in torque when a driver's steering torque is generated in a vehicle running in an automatic steering mode.

In addition, an embodiment provides a method and device for stably controlling movement of a vehicle in an emergency situation while minimizing heterogeneity generated due to a sudden change in torque when a driver's steering torque is generated in a vehicle running in an automatic steering mode.

An embodiment devised for solving problems described above provides an electric power steering control device including: an automatic steering mode control unit configured to control a steering motor torque, which corresponds to automatic steering torque information or automatic steering angle information for running of a vehicle in an automatic steering mode, to be generated when the automatic steering torque information or the automatic steering angle information is received; an automatic steering mode release determination unit configured to determine whether to release the automatic steering mode when a steering torque or steering angle information generated according to a steering wheel operation of a driver is detected; and an automatic steering mode release unit configured to determine a release time of the steering motor torque applied in the automatic steering mode, by using the steering angle information generated according to the steering wheel operation of the driver when it is determined to release the automatic steering mode.

In addition, an embodiment provides a method for controlling electric power steering, including: controlling an automatic steering mode for controlling a steering motor torque, which corresponds to automatic steering torque information or automatic steering angle information for running of a vehicle in an automatic steering mode, to be generated when the automatic steering torque information or the automatic steering angle information is received; determining a release of an automatic steering mode for determining whether to release the automatic steering mode when a steering torque or steering angle information generated according to a steering wheel operation of a driver is detected; and releasing an automatic steering mode for determining a release time of the steering motor torque applied in the automatic steering mode, by using the steering angle information generated according to the steering wheel operation of the driver when it is determined to release the automatic steering mode.

The embodiment described above provides an effect of preventing a sudden change in torque when a driver's steering torque is generated in a vehicle running in an automatic steering mode.

In addition, an embodiment provides an effect of stably controlling movement of a vehicle in an emergency situation while minimizing heterogeneity generated due to a sudden change in torque when a driver's steering torque is generated in a vehicle running in an automatic steering mode.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected", "coupled", or "joined" to another component, a third component may be "connected", "coupled", and "joined" between the first and second components, although the first component may be directly connected, coupled or joined to the second component.

The present disclosure relates to an electric power steering control device and a method therefor.

An electric power steering control device refers to a device that controls an operation of a motor for generating a steering torque of a vehicle. In addition, the automatic steering mode in the present specification means a mode in which a vehicle automatically performs steering without a driver's steering control, such as an Angle Overlay function. For example, the automatic steering mode means a mode in which a vehicle automatically determines a running direction so as to perform steering, by using information received from various sensors and data transmission or reception devices, including a camera, a radar, etc., which may be included in the vehicle.

However, even when a vehicle is running in an automatic steering mode, an unexpected emergency situation may occur and, in this case, a steering operation may be performed by a driver. Accordingly, the present disclosure intends to propose a method and device for controlling movement of a vehicle in accordance with a steering operation of a driver when the vehicle is running in an automatic steering mode. Particularly, embodiments to be described below propose a method and device for improving reactivity of movement of a vehicle in order to quickly cope with an emergency situation while preventing a sudden torque change that may occur to reflect a steering operation of a driver to the movement of the vehicle.

Hereinafter, embodiments will be described in detail with reference to drawings.

Figure 1:
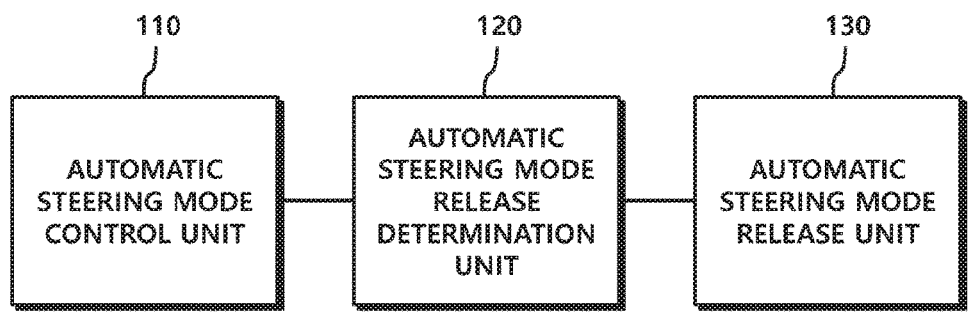
FIG. 1 is a diagram illustrating a configuration of an electric power steering control device according to an embodiment.

FIG. 1 is a diagram illustrating a configuration of an electric power steering control device according to an embodiment.

An electric power steering control device according to an embodiment may include: an automatic steering mode control unit configured to control a steering motor torque, which corresponds to automatic steering torque information or automatic steering angle information for running of a vehicle in an automatic steering mode, to be generated when the automatic steering torque information or the automatic steering angle information is received; an automatic steering mode release determination unit configured to determine whether to release the automatic steering mode when a steering torque or steering angle information generated according to a steering wheel operation of a driver is detected; and an automatic steering mode release unit configured to determine a release time of the steering motor torque applied in the automatic steering mode, by using the steering angle information generated according to the steering wheel operation of the driver when it is determined to release the automatic steering mode.

Referring to FIG. 1, an electric power steering control device 100 may include an automatic steering mode control unit 110 configured to control a steering motor torque, which corresponds to automatic steering torque information or automatic steering angle information for running of a vehicle in an automatic steering mode, to be generated when the automatic steering torque information or the automatic steering angle information is received. The automatic steering mode control unit 110 may control steering of a vehicle using the automatic steering torque information or automatic steering angle information when the automatic steering mode is started. The automatic steering torque information means torque information necessary for the vehicle to automatically perform steering. For example, the automatic steering torque information is obtained by extracting lane information from image information acquired from a camera and may include information on a steering torque necessary for the vehicle to run within the lane. That is, the steering torque information includes information on a steering torque that determines the running direction of the vehicle. The automatic steering angle information includes information on a running direction for the vehicle to automatically run. That is, if the automatic steering torque information described above includes information on the running direction of the vehicle, including a torque value, the automatic steering angle information includes information on the running direction of the vehicle, including a value of the running angle of the vehicle.

Therefore, the automatic steering mode control unit 110 may control a steering motor torque, which corresponds to the automatic steering torque information or automatic steering angle information associated with a running direction for the vehicle to automatically run, to be generated when the corresponding information is received. For example, when the automatic steering angle information is received, the automatic steering mode control unit 110 may perform control for calculating a steering motor torque necessary for the vehicle to run at a corresponding angle using a steering motor, and calculating a motor control current for generating the calculated steering motor torque so as to apply the same to a motor. Similarly, when the automatic steering torque information is received, the automatic steering mode control unit 110 may calculate the motor control current so as to apply the same to the motor so that a value of a corresponding steering torque is applied to the steering motor.

Meanwhile, the automatic steering mode may be configured according to an input signal of a driver. In addition, the automatic steering mode may be configured or released before or during vehicle running and, when the automatic steering mode is released, the steering motor may provide steering assist force according to the driver's steering torque so as to determine the running direction of the vehicle. In the automatic steering mode, the running direction of the vehicle may be determined using only the steering motor torque provided by the steering motor.

Further, the electric power steering control device 100 may include an automatic steering mode release determination unit 120 configured to determine whether to release the automatic steering mode when a steering torque or steering angle information generated according to a steering wheel operation of a driver is detected. The automatic steering mode release determination unit 120 may detect whether the driver has an intention to perform steering according to the steering wheel operation of the driver. For example, the automatic steering mode release determination unit 120 may determine whether the driver has an intention to perform steering, by using a steering torque or steering angle information generated when the driver operates a steering wheel in the automatic steering mode, and determine whether to release the automatic steering mode, by using determination on the driver's intention. For example, the automatic steering mode release determination unit 120 may determine whether to release the automatic steering mode, by using a steering torque or duration information generated according to the steering wheel operation of the driver. For another example, the automatic steering mode release determination unit 120 may determine whether to release the automatic steering mode, by using the steering angle or duration information generated according to the steering wheel operation of the driver. Further, a distinction according to a predetermined reference is needed in order to solve an automatic steering mode release error that may occur due to shaking of the vehicle or a steering wheel operation mistakenly performed by the driver. Specific embodiments will be described with reference to FIG. 3 to FIG. 6.

Meanwhile, the electric power steering control device 100 may include an automatic steering mode release unit 130 configured to determine a release time of the steering motor torque applied in the automatic steering mode, by using the steering angle information generated according to the steering wheel operation of the driver when it is determined to release the automatic steering mode. The automatic steering mode release unit 130 may determine the release time of the steering motor torque in response to the steering angle information generated according to the steering wheel operation of the driver when it is determined to release the automatic steering mode. For example, in the automatic steering mode, the vehicle may have been performing steering by a steering motor torque. In this case, the automatic steering mode release unit 130 needs to release the steering motor torque of the time point at which determination on a release of the automatic steering mode has been made, and change the steering motor torque according to the driver's steering torque. However, when the automatic steering mode is released, there is a risk that steering control force applied to the vehicle is lost in a case where the steering motor torque is directly changed to 0. In order to prevent such a risk, the automatic steering mode release unit 130 needs to ramp down the steering motor torque applied in the automatic steering mode during a predetermined time so as to sequentially reduce the same when it is determined to release the automatic steering mode. In the present specification, the time for sequentially reducing, to 0, the steering motor torque applied in the automatic steering mode is defined as the release time and used.

Meanwhile, when the driver suddenly changes the running direction of the current vehicle according to an emergency situation, there may occur a big difference between the steering motor torque being applied to the steering motor in the automatic steering mode and the torque according to the driver's operation. In addition, it is necessary to quickly reflect the driver's steering operation to the vehicle in an emergency situation. That is, a sudden change in torque is necessary in order to apply the steering motor torque to which the driver's steering torque is reflected at a time point when the automatic steering mode is released. However, a sudden change in torque may cause heterogeneity in the steering wheel operation of the driver and interfere with the stability of vehicle movement.

Therefore, when it is determined to release the automatic steering mode, the automatic steering mode release unit 130 needs to distinguish whether the steering wheel operation of the driver is to avoid an emergency situation or belongs to a normal release operation, by using information according to the steering wheel operation of the driver, so as to dynamically configure the release time of the steering motor torque being applied to the vehicle. To this end, the automatic steering mode release unit 130 dynamically calculates the release time using the steering angle information according to the steering wheel operation of the driver. The steering angle information may be checked by a steering angle sensor, and the automatic steering mode release unit 130 may dynamically calculate the release time suitable for each situation by using at least one piece of information among steering angular velocity information, and weight value factor and predetermined release time information. A specific embodiment for dynamically configuring the release time will be described again with reference to FIG. 7. The weight value factor means a predetermined weight value and the term thereof is not limited.

Figure 2:
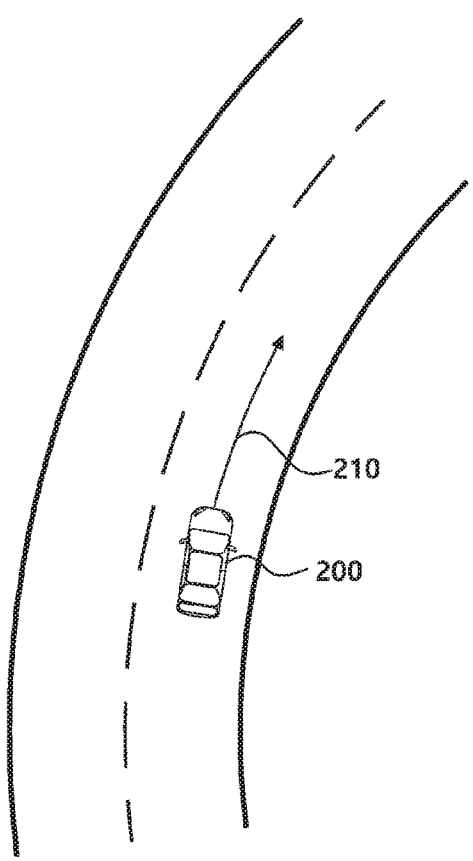
FIG. 2 is a diagram for explaining an automatic steering mode according to an embodiment.

FIG. 2 is a diagram for explaining an automatic steering mode according to an embodiment.

Referring to FIG. 2, a vehicle 200 may extract information of a lane on the road using image information received through a camera sensor. There is no limitation of a method for extracting lane information from image information. For another example, the vehicle 200 may configure a running route of the vehicle using destination input information of the driver and the current location information of the vehicle 200, and may also configure the automatic steering mode such that the vehicle 200 runs the running route without deviating therefrom. To this end, the automatic steering mode may determine the running direction 210 of the vehicle using the running route of the vehicle 200 and road information such that the vehicle 200 does not deviate from the running route and the lane. For still another example, when the automatic steering mode is configured to follow a preceding vehicle, the vehicle 200 may configure the running direction 210 by controlling the steering motor of the vehicle so that the vehicle 200 follows the preceding vehicle detected through a radar sensor.

Accordingly, the automatic steering mode is a mode in which the vehicle 200 automatically configures the running direction 210 by using data transmitted or received to or from a sensor formed inside or outside the vehicle. The automatic steering mode may be variously named according to characteristics and configurations of the vehicle. In the present specification, the automatic steering mode means a mode in which the running direction is configured using the steering motor in the vehicle without intervention of the driver.

Figure 3:
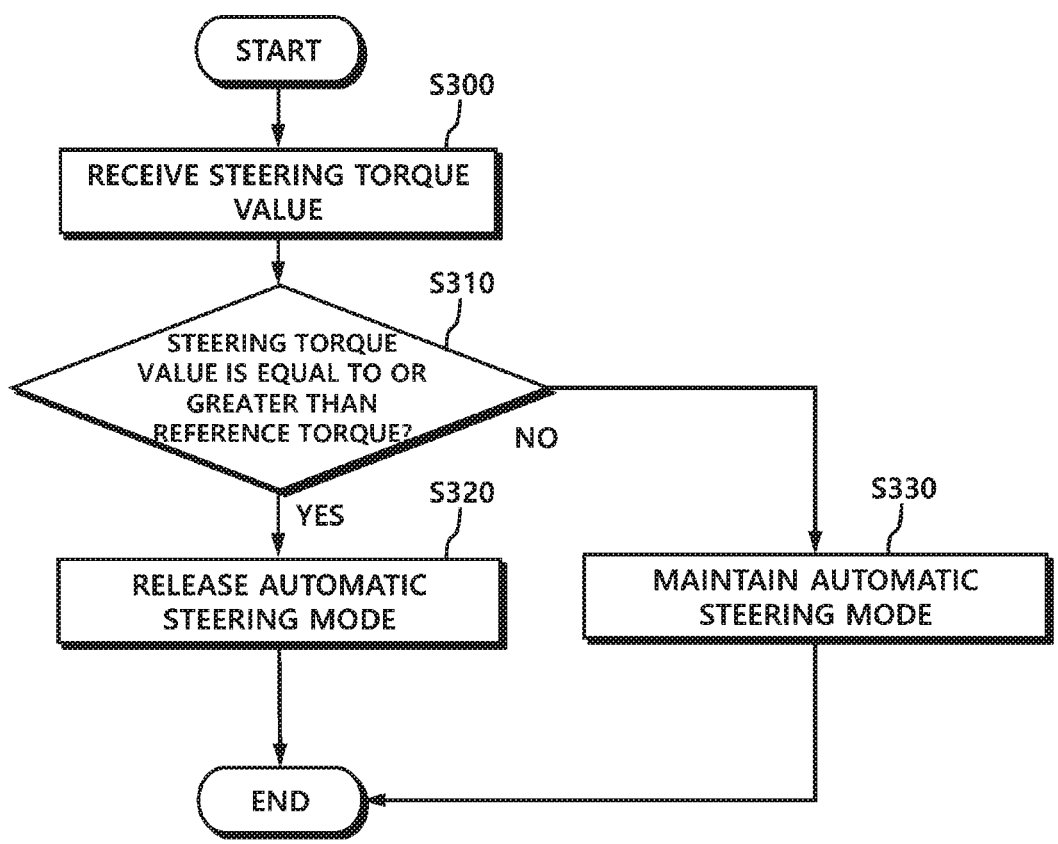
FIG. 3 is a diagram illustrating an example of an operation for determining whether to release an automatic steering mode based on a steering torque according to an embodiment.

FIG. 3 is a diagram illustrating an example of an operation for determining whether to release an automatic steering mode based on a steering torque according to an embodiment.

The automatic steering mode release determination unit 120 may determine to release the automatic steering mode when a steering torque value is equal to or greater than a predetermined reference torque.

Referring to FIG. 3, a steering torque according to a steering wheel operation of a driver may be detected when a vehicle is in the middle of running in the automatic steering mode. However, a steering torque may be minutely detected according to an error made by the driver, vibration generated inside or outside the vehicle, or the like. Even in this case, there occurs a problem in which the driver may not be able to properly control movement of the vehicle due to an unexpected release of the automatic steering mode when the automatic steering mode is released. Therefore, even when information on the steering torque by the driver is detected, the automatic steering mode release determination unit 120 may not immediately determine to release the automatic steering mode, and compare a detected steering torque value with a predetermined reference torque so as to determine whether to release the automatic steering mode. Accordingly, the stability of running of the vehicle may be improved.

Specifically, the automatic steering mode release determination unit 120 may receive a steering torque value detected by a torque sensor according to a steering wheel operation of the driver (S300). The steering torque value is a value different from automatic steering torque information for determining the steering motor torque in the automatic steering mode described above, and the automatic steering torque information refers to a torque value necessary for the vehicle to run within the lane based on an image of the proceeding direction of the vehicle. On the other hand, the steering torque value means torque information detected according to torsion of the torsion bar based on a steering wheel operation of the driver. Therefore, locations at which the steering torque value and the automatic steering torque information are detected differ from each other, and an information flag and an information format may be differently configured. The steering torque value may be detected by a torque sensor, a torque angle sensor, etc., which are included in the vehicle.

The automatic steering mode release determination unit 120 compares the received steering torque value with a reference torque predetermined through an experiment and the like (S310). For example, the automatic steering mode release determination unit 120 may determine whether the steering torque value is detected to be equal to or greater than the predetermined reference torque.

If the steering torque value generated by the driver is greater than the reference torque, the automatic steering mode release determination unit 120 may determine to release the automatic steering mode (S320). This is because it may be determined that the driver has operated the steering wheel in accordance with an intention to release the automatic steering mode, not the steering wheel operation performed by mistake.

Alternatively, when the steering torque value generated by the driver is smaller than the reference torque, the automatic steering mode release determination unit 120 may determine to maintain the automatic steering mode (S330).

That is, the running stability of the vehicle may be increased using the fact that the steering torque value is detected to be small when the driver operates the steering wheel by mistake or when torsion occurs in the torsion bar due to vibration generated inside or outside the vehicle.

However, the driver may mistakenly operate the steering wheel at a large angle and, in this case, the steering torque value may be temporarily detected to be larger than the reference torque. Therefore, a method for preventing such a case also needs to be considered.

Figure 4:
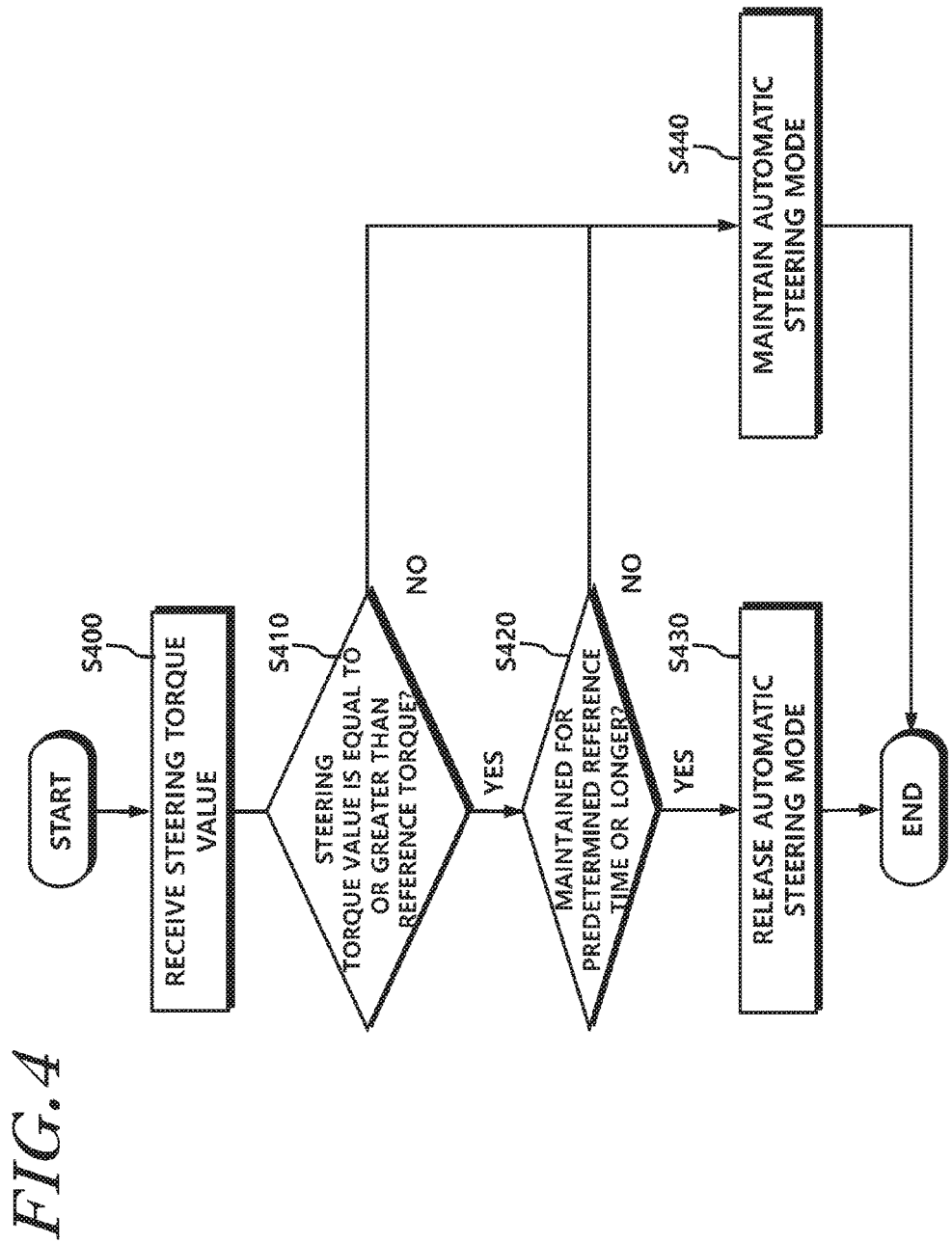
FIG. 4 is a diagram illustrating another example of an operation for determining whether to release an automatic steering mode based on a steering torque according to an embodiment.

FIG. 4 is a diagram illustrating another example of an operation for determining whether to release an automatic steering mode based on a steering torque according to an embodiment.

The automatic steering mode release determination unit 120 may determine to release the automatic steering mode when the steering torque value equal to or greater than the predetermined reference torque is maintained for a predetermined reference time or longer.

Referring to FIG. 4, it may be possible to improve the running stability of the vehicle and prevent the automatic steering mode from being unexpectedly released even when a large steering torque value is temporarily generated due to the driver's mistake or the like.

Specifically, the automatic steering mode release determination unit 120 may receive a steering torque value detected according to a steering wheel operation of the driver (S400). As described above, the steering torque value may be generated according to various situations regardless of the intention of the driver, and the distinction therebetween needs to be made.

To this end, the automatic steering mode release determination unit 120 primarily determines whether the steering torque value is equal to or greater than the reference torque (S410). If the steering torque value is detected to be smaller than the reference torque, the automatic steering mode release determination unit 120 may determine to maintain the automatic steering mode (S440). Accordingly, it may be possible to prevent the automatic steering mode from being unexpectedly released.

Alternatively, when the steering torque value is detected to be equal to or greater than the reference torque, the automatic steering mode release determination unit 120 may determine whether the steering torque value detected to be equal to or greater than the reference torque is continuously maintained for a reference time or longer (S420). That is, the automatic steering mode release determination unit 120 may determine whether the steering torque value detected to be equal to or greater than the reference torque is maintained for a predetermined reference time or longer so as to determine whether to release the automatic steering mode of the vehicle. For example, when the steering torque value is unable to be maintained for the reference time or longer, the automatic steering mode release determination unit 120 may determine to maintain the automatic steering mode (S440). Accordingly, the running stability of the vehicle may be secured by disregarding the steering torque value generated according to the driver's temporary mistake. For another example, when the steering torque value is maintained for the reference time or longer, the automatic steering mode release determination unit 120 may determine to release the automatic steering mode (S430). In this case, it may be determined that the driver has an intention to operate steering so as to release the automatic steering mode, and movement of the vehicle may be controlled according to the driver's intention to operate steering.

Meanwhile, in FIG. 3 and FIG. 4, the embodiments have been described in which a release of the automatic steering mode is determined using the steering torque value. However, the release of the automatic steering mode may also be determined using steering angle information according to a steering wheel operation of the driver. Hereinafter, a case of using steering angle information will be described through examples.

Figure 5:
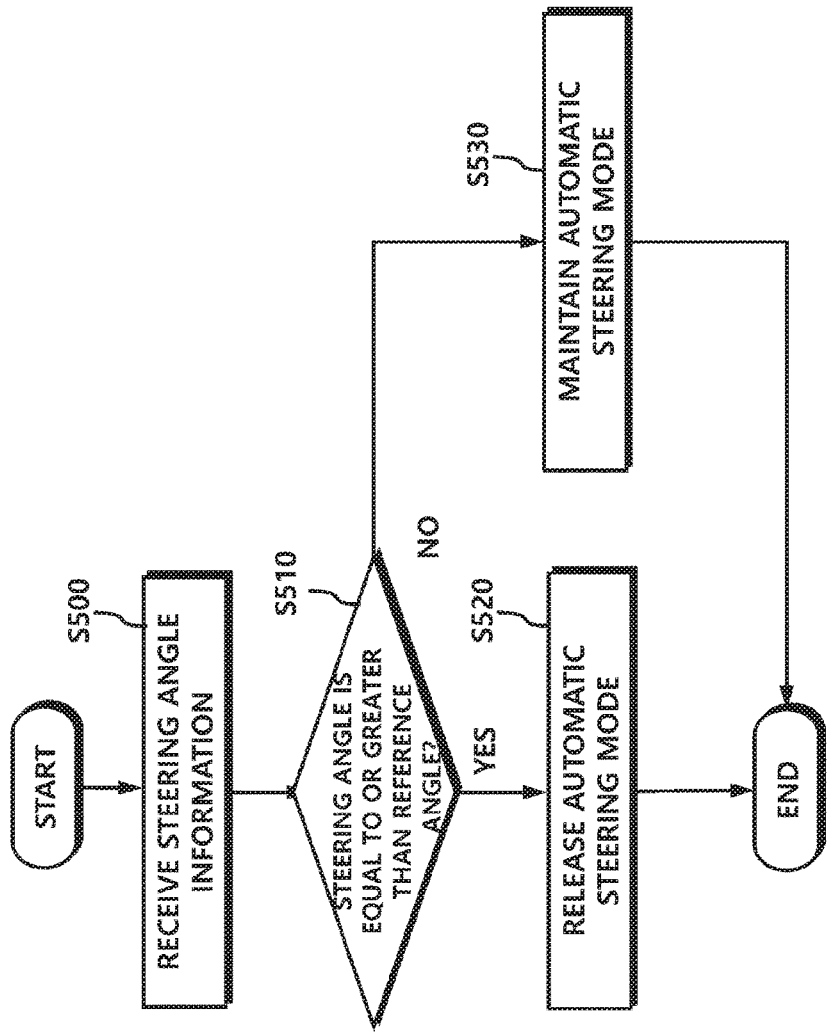
FIG. 5 is a diagram illustrating an example of an operation for determining whether to release an automatic steering mode based on a steering angle according to an embodiment.

FIG. 5 is a diagram illustrating an example of an operation for determining whether to release an automatic steering mode based on a steering angle according to an embodiment.

The automatic steering mode release determination unit 120 may determine to release the automatic steering mode when steering angle information is equal to or greater than a predetermined reference angle.

Referring to FIG. 5, the automatic steering mode release determination unit 120 may receive steering angle information generated according to a steering wheel operation of the driver (S500). The steering angle information may be detected by a steering angle sensor, a torque angle sensor, or the like.

The automatic steering mode release determination unit 120 may determine whether the received steering angle information is equal to or greater than a predetermined reference angle (S510). That is, the automatic steering mode release determination unit 120 may determine whether a steering angle generated according to the steering wheel operation of the driver is equal to or greater than the reference angel so as to determine whether to release the automatic steering mode.

For example, the automatic steering mode release determination unit 120 may determine to maintain the automatic steering mode when the steering angle information is smaller than the reference angle (S530). Since movement of the steering wheel, which is generated according to vibration of the vehicle and the like, is not generated at a large angle, it may be indirectly determined therethrough whether the steering angle information is generated according to the intention of the driver.

For another example, when the steering angle information is equal to or greater than the reference angle, the automatic steering mode release determination unit 120 may determine to release the automatic steering mode (S520). The automatic steering mode release determination unit 120 may determine that the driver has an intention to change the running direction of the vehicle at a large angle, as in an emergency situation, so as to release the automatic steering mode.

However, since the driver may temporarily operate the steering wheel at a large angle by mistake, it is necessary to consider additional factors in the steering angle information.

Figure 6:
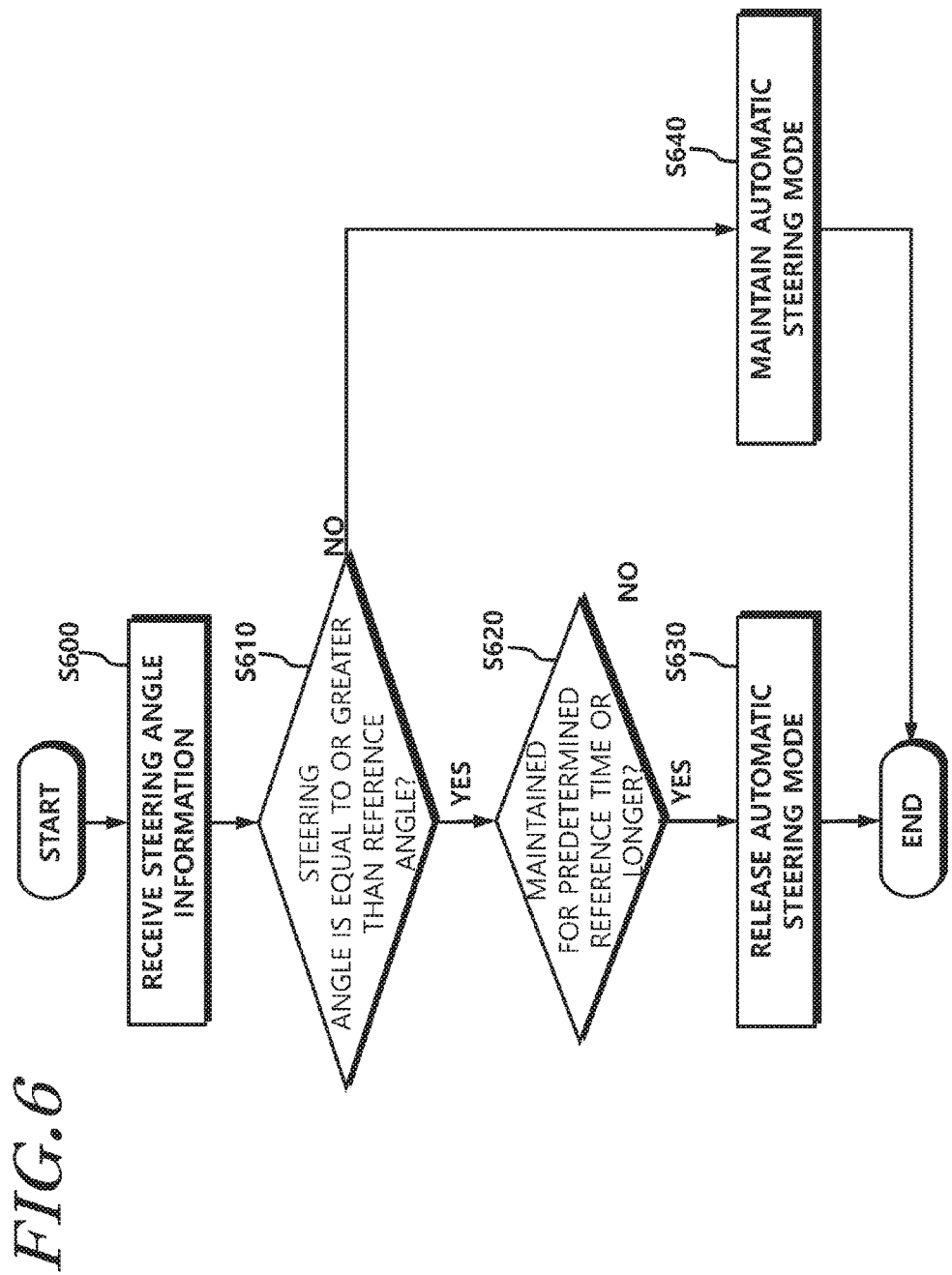
FIG. 6 is a diagram illustrating another example of an operation for determining whether to release an automatic steering mode based on a steering angle according to an embodiment.

FIG. 6 is a diagram illustrating another example of an operation for determining whether to release an automatic steering mode based on a steering angle according to an embodiment.

The automatic steering mode release determination unit 120 may determine to release the automatic steering mode when steering angle information equal to or greater than a predetermined reference angle is maintained for a predetermined reference time or longer.

Referring to FIG. 6, the automatic steering mode release determination unit 120 may receive steering angle information generated according to steering wheel operation of a driver (S600), and determine whether the received steering angle information is equal to or greater than a predetermined reference angle (S610).

As described above, the automatic steering mode release determination unit 120 may determine to maintain the automatic steering mode when the steering angle information is smaller than a reference angle (S640). Accordingly, it may be possible to primarily prevent the automatic steering mode from being released according to minute movement of a steering wheel.

The automatic steering mode release determination unit 120 may secondarily determine whether the steering angle information is continuously maintained for a reference time or longer when the steering angle information is equal to or greater than the reference angle (S620). That is, the automatic steering mode release determination unit 120 may distinguish whether a steering wheel operation at a large angle is a temporary phenomenon having occurred by the driver's mistake or a continuous phenomenon having occurred according to the driver's intention. For example, when the steering angle is unable to be maintained for the reference time or longer, the automatic steering mode release determination unit 120 may determine to maintain the automatic steering mode (S640). Accordingly, the running stability of the vehicle may be secured by disregarding reception of the steering angle information generated according to the driver's temporary mistake. For another example, when the steering angle information is maintained for the reference time or longer, the automatic steering mode release determination unit 120 may determine to release the automatic steering mode (S630). In this case, it may be determined that the driver has an intention to operate steering so as to release the automatic steering mode, and movement of the vehicle may be controlled according to the driver's intention to operate steering.

As described above, the automatic steering mode release determination unit 120 may determine whether to release the automatic steering mode according to the steering wheel operation of the driver, while using steering torque information or steering angle information and various predetermined reference information in order to secure the stability of the vehicle.

Meanwhile, the automatic steering mode release determination unit 120 may determine whether to release the automatic steering mode, using both steering torque information and steering angle information.

For example, the automatic steering mode release determination unit 120 may determine to release the automatic steering mode only when both cases where the steering torque information is equal to or greater than the reference torque and the steering angle information is equal to or greater than the reference angle are satisfied. Alternatively, the automatic steering mode release determination unit 120 may determine to release the automatic steering mode only when the steering torque information and the steering angle information are continuously increased for the predetermined reference time or longer. For example, when the steering torque information of the driver or the steering angle information is increased and then decreased within the reference time, the automatic steering mode release determination unit 120 may determine that the driver has made a mistake so as to maintain the automatic steering mode.

In addition, each of the embodiments for determining whether to release the automatic steering mode, by using the steering torque information and the steering angle information may be combined and operated.

Meanwhile, at least two of the reference torque, the reference angle, and the reference time, which are described above, may be combined and stored in the form of a table. For example, a plurality of reference torques and a plurality of reference times may be mapped one-to-one so as to be stored as a reference table having a plurality of levels. The automatic steering mode release determination unit 120 may determine whether to release the described automatic steering mode by using the stored table. Alternatively, a plurality of reference angles and a plurality of reference times may be mapped one-to-one so as to be stored as a reference table having a plurality of levels.

For example, the stored table may have four levels, and each of the levels may have a set of a reference torque and a reference time value. Likewise, each of the levels included in the stored table may have a set of a reference angle and a reference time value.

For another example, the stored table may store a table having a plurality of sets each of which has a set of a reference torque, a reference angle, and a reference time.

In this case, the automatic steering mode release determination unit 120 may use a reference torque, a reference angle, or a reference time, which is stored in the table, for determining whether to release the automatic steering mode described above. That is, each of the four levels has different values from each other, and the automatic steering mode release determination unit 120 may use a reference torque, a reference time, or a reference angle, which is included in a specific level, as reference values for determining whether to release the automatic steering mode described above when the corresponding specific level is indicated to be used according to pre-configuration.

Meanwhile, when each level of the table includes a reference torque and a reference time as factors, a reference torque value may be increased and a reference time value may be decreased, as the level increases. That is, the reference torque and the reference time may be configured to be inversely proportional to each other. Likewise, when each level of the table includes a reference angle and a reference time as factors, a reference angle value may be increased and a reference time value may be decreased, as the level increases. That is, the reference angle and the reference time may be configured to be inversely proportional to each other. Surely, the increase and decrease of the level may be modified by configuration, and configuration may be performed such that the reference torque value or the reference angle value may be increased and the reference time value may be decreased, as the level decreases.

The automatic steering mode release determination unit 120 may determine whether to release the automatic steering mode, through the methods described above by using, as reference values, factors included in a level predetermined or configured by an operation of the driver among levels configured in the table.

As described in each of the embodiments, the automatic steering mode release unit 130 may release a steering motor torque generated by the automatic steering mode according to a determination on a release of the automatic steering mode, which is made by the automatic steering mode release determination unit 120.

When it is determined to release the automatic steering mode, the automatic steering mode release unit 130 may determine a release time of the steering motor torque applied in the automatic steering mode, using steering angle information generated according to the steering wheel operation of the driver. The steering angle information may be detected by a steering angle sensor according to the steering wheel operation of the driver, and may be detected by the steering angle sensor even when it is determined to release the automatic steering mode based on the steering torque information as described above.

Specifically, the automatic steering mode release unit 130 may calculate steering angular velocity information using the steering angle information, and determine the release time using the steering angular velocity information. For example, when steering angle information is received, the automatic steering mode release unit 130 may calculate the steering angular velocity information which means steering angular information changing along with time. The automatic steering mode release unit 130 may determine the release time of the steering motor torque, by using the calculated steering angular velocity information and a predetermined reference release time.

For example, the automatic steering mode release unit 130 may determine the release time by multiplying the reference release time by a weight value factor determined in association with the steering angular velocity information. In this case, the weight value factor may have a value greater than 0 and equal to or smaller than 1. The reference release time refers to a release time of the steering motor torque predetermined through an experiment and the like. The weight value factor may be predetermined in response to each of steering angular velocity information. For example, the weight value factor may be pre-stored in the form of a table corresponding to each of steering angular velocity information, and may be determined according to a predetermined mathematical expression for determining a weight value factor. Specifically, when the steering angular velocity information is calculated, the automatic steering mode release unit 130 extracts a weight value factor corresponding to the corresponding steering angular velocity information by using a predetermined weight value factor table. Later, the automatic steering mode release unit 130 may determine a release time of the steering motor torque by multiplying the predetermined reference release time by the extracted weight value factor. The weight value factor may be configured to be a value which becomes smaller as the steering angular velocity value becomes larger. That is, the automatic steering mode release unit 130 may determine the steering angular velocity value and the release time to be inversely proportional to each other, by multiplying the reference release time by the value which becomes smaller as the steering angular velocity value becomes larger. Meanwhile, tables for weight value factors may be configured to correspond to steering angular velocity information in a predetermined section. For example, a predetermined steering angular velocity section may have a table configured to be mapped to one weight value factor, and another steering angular velocity section may have a table configured to be mapped to another weight value factor. Accordingly, the release time may be determined stepwise.

For another example, the automatic steering mode release unit 130 may determine the release time to be inversely proportional to the steering angular velocity information. For example, when the steering angular velocity information is within a predetermined section, the automatic steering mode release unit 130 may configure the release time in the corresponding section to have a value inversely proportional to the steering angular velocity information.

For still another example, the automatic steering mode release unit 130 may determine the release time to be a predetermined upper limit value when the steering angular velocity information is equal to or smaller than a predetermined first reference value, and may determine the release time to be a predetermined lower limit value when the steering angular velocity information is equal to or greater than a predetermined second reference value. That is, the upper limit value or the lower limit value of the release time may be predetermined. Further, the upper limit value and the lower limit value of the release time are the time necessary in terms of the mechanical characteristics of the steering motor and necessary for preventing a sudden change in torque, and may be determined through an experiment, and the like. Therefore, when it is determined that the steering angular velocity information is equal to or smaller than the predetermined first reference value, the automatic steering mode release unit 130 may determine the release time to be a fixed release time which is the predetermined upper limit value. In contrast, when it is determined that the steering angular velocity information is equal to or greater than the predetermined second reference value, the automatic steering mode release unit 130 may determine the release time to be a fixed release time which is the predetermined lower limit value. The first reference value and the second reference value may be the same or may be different.

When the steering angular velocity information is calculated into a value between the first reference value and the second reference value, the automatic steering mode release unit 130 may use, as the reference release time, the upper limit value or the lower limit value of the release time so as to determine the release time by multiplying the weight value factor described above by the reference release time. Alternatively, when the steering angular velocity information is calculated into a value between the first reference value and the second reference value, the automatic steering mode release unit 130 may use the upper limit value or the lower limit value, as the reference release time so as to determine the release time at a constant change rate.

Figure 7:
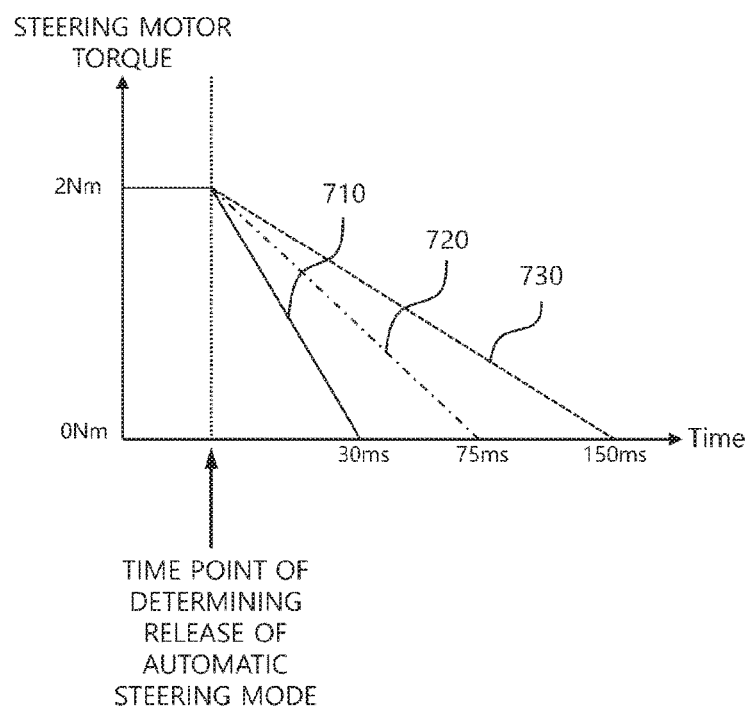
FIG. 7 is a diagram exemplarily illustrating a change in motor torque for each release time of a steering motor torque according to an embodiment.

FIG. 7 is a diagram exemplarily illustrating a change in motor torque for each release time of a steering motor torque according to an embodiment.

Referring to FIG. 7, description of a change in the steering motor torque, in a case where the automatic steering mode release unit 130 determines the release time by using steering angular velocity information as described above, is provided. In FIG. 7, it is assumed that a steering motor torque value according to the automatic steering mode is 2 Nm. Further, a time required until the steering motor torque value according to the automatic steering mode becomes 0 Nm is the release time, and a time point of automatic steering mode release determination is 0 ms.

In case of reference numeral 710, the steering angular velocity information is 200 deg/s, and the release time may be determined to be 30 ms. When the release time is determined, the steering motor torque may rapidly reduce the steering motor torque in order to make the steering motor torque value 0 in accordance with the release time.

In case of reference numeral 720, the steering angular velocity information is 100 deg/s, and the release time may be determined to be 75 ms. Further, in case of reference numeral 730, the steering angular velocity information is 30 deg/s, and the release time may be determined to be 150 ms.

Accordingly, the automatic steering mode release unit 130 may determine the release time to be inversely proportional to the steering angular velocity value such that the release time decreases when the steering angular velocity value increases. Alternatively, the automatic steering mode release unit 130 may determine the release time of the case of reference numeral 720 by determining 150 ms as an upper limit value of the release time and determining 30 ms as a lower limit value of the release time. In this case, the first reference value described above may be 30 deg/s and the second reference value may be 200 deg/s. Therefore, the automatic steering mode release unit 130 may determine the release time as 150 ms even when the steering angular velocity information is 20 deg/s, and determine the release time as 30 ms even when the steering angular velocity information is 250 deg/s.

As described above, the electric power steering control device 100 may configure the release time in variously ways so that a sudden change in torque may be prevented while appropriately coping with an emergency situation at the same time, in relation to releasing the automatic steering mode according to the steering wheel operation of the driver.

A method for controlling electric power steering, by which all the present embodiments described above can be performed, will be briefly described with reference to FIG. 8.

Figure 8:
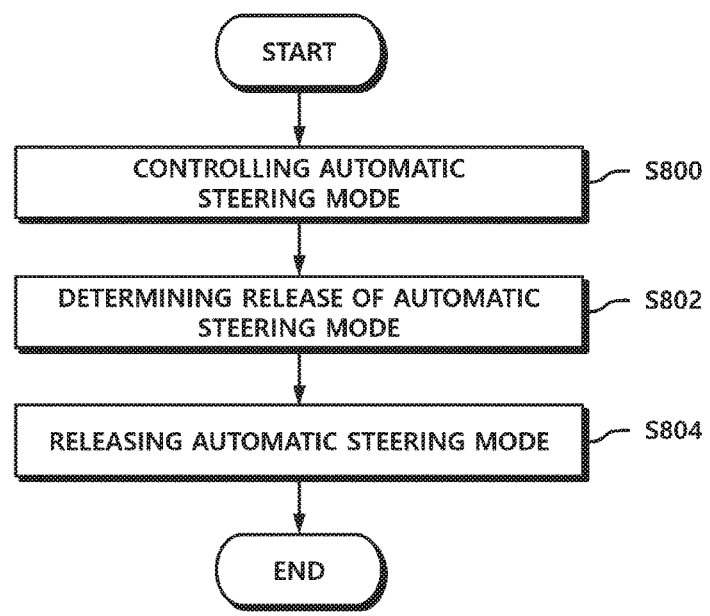
FIG. 8 is a flowchart illustrating a method for controlling electric power steering according to another embodiment.

FIG. 8 is a flowchart illustrating a method for controlling electric power steering according to another embodiment.

A method for controlling electric power steering according to an embodiment may include: controlling an automatic steering mode for controlling a steering motor torque, which corresponds to automatic steering torque information or automatic steering angle information for running of a vehicle in an automatic steering mode, to be generated when the automatic steering torque information or the automatic steering angle information is received; determining a release of an automatic steering mode for determining whether to release the automatic steering mode when a steering torque or steering angle information generated according to a steering wheel operation of a driver is detected; and releasing an automatic steering mode for determining a release time of the steering motor torque applied in the automatic steering mode, by using the steering angle information generated according to the steering wheel operation of the driver when it is determined to release the automatic steering mode.

Referring to FIG. 8, a method for controlling electric power steering may include controlling an automatic steering mode for controlling a steering motor torque, which corresponds to automatic steering torque information or automatic steering angle information for running of a vehicle in an automatic steering mode, to be generated when the automatic steering torque information or the automatic steering angle information is received (S800). Controlling of the automatic steering mode may include controlling steering of a vehicle by using the automatic steering torque information or the automatic steering angle information when the automatic steering mode is started. The automatic steering torque information means torque information necessary for the vehicle to automatically perform steering. The automatic steering angle information includes information on a running direction for the vehicle to automatically run. Therefore, controlling of the automatic steering mode may include performing control such that the steering motor torque, which corresponds to automatic steering torque information or automatic steering angle information relating to the running direction for the vehicle to automatically run, is generated when the corresponding information is received. For example, controlling of the automatic steering mode may include performing control to calculate the steering motor torque necessary for the vehicle to run at a corresponding angle by using a steering motor when the automatic steering angular information is received, and calculate a motor control current for generating the calculated steering motor torque so as to apply the same to a motor. Likewise, controlling of the automatic steering mode may include calculating the motor control current and applying the same to the motor so that a corresponding steering torque value is applied to the steering motor when the automatic steering torque information is received.

The method for controlling electric power steering may include determining a release of an automatic steering mode for determining whether to release the automatic steering mode when a steering torque or steering angle information generated according to a steering wheel operation of a driver is detected (S802). Determining of the release of the automatic steering mode may include detecting whether the driver has an intention to perform steering according to a steering wheel operation of the driver. For example, determining of the release of the automatic steering mode may include determining whether the driver has an intention to perform steering, by using a steering torque or steering angle information generated when the driver operates a steering wheel in the automatic steering mode, and determining whether to release the automatic steering mode, by using determination on the driver's intention. For example, determining of the release of the automatic steering mode may include determining whether to release the automatic steering mode, by using a steering torque or steering angle information generated according to the steering wheel operation of the driver. That is, determination on whether to release the automatic steering mode may be made using the steering torque or steering angle information, and a predetermined reference value. For another example, determining of the release of the automatic steering mode may include determining whether to release the automatic steering mode, by using duration information in addition to the steering torque or the steering angle information.

The method for controlling electric power steering may include releasing an automatic steering mode for determining a release time of the steering motor torque applied in the automatic steering mode, by using the steering angle information generated according to the steering wheel operation of the driver when it is determined to release the automatic steering mode (S804). Releasing of the automatic steering mode may include determining the release time of the steering motor torque in association with the steering angle information generated according to the steering wheel operation of the driver when it is determined to release the automatic steering mode. For example, when it is determined to release the automatic steering mode, releasing of the automatic steering mode includes requiring to distinguish whether the steering wheel operation of the driver is to avoid an emergency situation or belongs to a normal release operation, by using information according to the steering wheel operation of the driver, so as to dynamically configure the release time of the steering motor torque being applied to the vehicle. To this end, releasing of the automatic steering mode includes dynamically calculating the release time using the steering angle information according to the steering wheel operation of the driver.

For example, releasing of the automatic steering mode may include dynamically determining the release time using a weight value factor and steering angular velocity information calculated using steering angular information. For another example, releasing of the automatic steering mode may include determining the release time within a predetermined range by using the steering angular velocity information, and predetermined upper limit value and lower limit value of the release time. For another example, releasing of the automatic steering mode may include determining the release time using reference release time information such that the reference release time information is inversely proportional to the steering angular velocity information.

The present disclosure described above provides an effect of preventing a sudden change in torque when a steering torque of a driver is generated in a vehicle running in an automatic steering mode. In addition, the present disclosure provides an effect of stably controlling movement of a vehicle in an emergency situation while minimizing heterogeneity generated due to a sudden change in torque when a driver's steering torque is generated in a vehicle running in an automatic steering mode.

Even when all the elements constituting the above embodiments have been described as being combined into a single unit or combined to be operated as a single unit, the present disclosure is not necessarily limited to such embodiments. That is, at least two elements of all structural elements may be selectively joined and operate without departing from the scope of the present disclosure. Although a preferred embodiment of the present disclosure has been described for illustrative purposes, those skilled in the art will appreciate that various modifications and variations are possible, without departing from the essential characteristics of the disclosure. The scope of the present disclosure shall be construed on the basis of the accompanying claims in such a manner that all of the technical ideas included within the scope equivalent to the claims belong to the present disclosure.

What is claimed is:

1. An electric power steering control device including one or more electrical circuits, comprising:
    an automatic steering mode control unit configured to
        receive, when a vehicle is operated in an automatic steering mode, automatic steering torque information for a steering torque of the vehicle in the automatic steering mode or automatic steering angle information for a steering angle of the vehicle in the automatic steering mode, and
        control a steering motor torque to operate the vehicle in the automatic steering mode based on the automatic steering torque information or the automatic steering angle information;
    an automatic steering mode release determination unit configured to
        detect a steering torque or a steering angle to be generated when a driver operates a steering wheel of the vehicle, and
        determine whether to release the automatic steering mode based on the detected steering torque or the detected steering angle; and
    an automatic steering mode release unit configured to determine a release time to release the steering motor torque being currently applied in the automatic steering mode, by using the detected steering angle when the automatic steering mode is determined to be released.

2. The electric power steering control device of claim 1, wherein the automatic steering mode release determination unit is configured to determine to release the automatic steering mode when a value of the detected steering torque is equal to or greater than a value of a predetermined reference torque.

3. The electric power steering control device of claim 2, wherein the automatic steering mode release determination unit is configured to determine to release the automatic steering mode when the value of the steering torque, which is equal to or greater than the value of the predetermined reference torque, is maintained for a predetermined reference time or longer.

4. The electric power steering control device of claim 1, wherein the automatic steering mode release determination unit is configured to determine to release the automatic steering mode when the detected steering angle is equal to or greater than a predetermined reference angle.

5. The electric power steering control device of claim 4, wherein the automatic steering mode release determination unit is configured to determine to release the automatic steering mode when the detected steering angle, which is equal to or greater than the predetermined reference angle, is maintained for a predetermined reference time or longer.

6. The electric power steering control device of claim 1, wherein the automatic steering mode release unit is configured to control the steering motor torque being currently applied in the automatic steering mode to be decreased during the release time when the automatic steering mode is determined to be released.

7. The electric power steering control device of claim 1, wherein the automatic steering mode release unit is configured to calculate a steering angular velocity by using the detected steering angle, and determine the release time by using information for the steering angular velocity.

8. The electric power steering control device of claim 7, wherein the automatic steering mode release unit is configured to determine the release time by multiplying a reference release time by a weight value factor determined in association with the information for the steering angular velocity, in which the weight value factor has a value that is greater than and equal to or smaller than 1.

9. The electric power steering control device of claim 8, wherein the weight value factor is determined in response to each predetermined section of the information for the steering angular velocity.

10. The electric power steering control device of claim 7, wherein the release time is configured to be inversely proportional to the steering angular velocity.

11. The electric power steering control device of claim 7, wherein the automatic steering mode release unit is configured to determine the release time as a predetermined upper limit value when the steering angular velocity is equal to or smaller than a predetermined first reference value, and determine the release time as a predetermined lower limit value when the steering angular velocity is equal to or greater than a predetermined second reference value.

12. A method for controlling electric power steering, comprising:
receiving, when a vehicle is operated in an automatic steering mode, automatic steering torque information for a steering torque of the vehicle in the automatic steering mode or automatic steering angle information for a steering angle of the vehicle in the automatic steering mode;
controlling a steering motor torque to operate the vehicle in the automatic steering mode based on the automatic steering torque information or the automatic steering angle information;
detecting a steering torque or a steering angle to be generated when a driver operates a steering wheel of the vehicle;
determining whether to release the automatic steering mode based on the detected steering torque or the detected steering angle;
determining a release time to release the steering motor torque being currently applied in the automatic steering mode, by using the detected steering angle when the automatic steering mode is determined to be released; and
releasing the automatic steering mode based on the determined release time to apply to the vehicle the detected torque or the detected steering angle according to the operation of the driver's steering wheel.

13. The method for controlling electric power steering of claim 12, wherein releasing of the automatic steering mode comprises calculating steering angular velocity by using the detected steering angle, and determining the release time by using the steering angular velocity.

14. The method for controlling electric power steering of claim 13, wherein releasing of the automatic steering mode comprises determining the release time by multiplying a reference release time by a weight value factor determined in association with the information for the steering angular velocity, in which the weight value factor has a value that is greater than 0, and equal to or smaller than 1.

* * * * *